(12) United States Patent
Mulcaire

(10) Patent No.: US 10,087,775 B2
(45) Date of Patent: Oct. 2, 2018

(54) GAS TURBINE ENGINE COOLING ARRANGEMENT

(71) Applicant: ROLLS-ROYCE PLC, London (GB)

(72) Inventor: Thomas Gerard Mulcaire, Derby (GB)

(73) Assignee: ROLLS-ROYCE plc, London (GB)

( * ) Notice: Subject to any disclaimer, the term of this patent is extended or adjusted under 35 U.S.C. 154(b) by 527 days.

(21) Appl. No.: 14/199,099

(22) Filed: Mar. 6, 2014

(65) Prior Publication Data

US 2014/0290272 A1    Oct. 2, 2014

(30) Foreign Application Priority Data

Mar. 26, 2013 (GB) ................................. 1305432.5

(51) Int. Cl.
*F03B 11/00* (2006.01)
*F01D 25/08* (2006.01)
(Continued)

(52) U.S. Cl.
CPC ............. *F01D 25/12* (2013.01); *F01D 5/082* (2013.01); *F01D 5/085* (2013.01); *F01D 9/065* (2013.01);
(Continued)

(58) Field of Classification Search
CPC ........ F01D 9/065; F01D 25/12; F01D 25/246; F01D 25/14; F01D 25/26; F01D 25/28;
(Continued)

(56) References Cited

U.S. PATENT DOCUMENTS 3,452,542 A    7/1969    Saferstein et al.
3,989,410 A  * 11/1976   Ferrari ...................... F01D 3/00
                                                              415/115
(Continued)

FOREIGN PATENT DOCUMENTS

EP    2 123 863 A1    11/2009
EP    2 354 459 A2     8/2011
(Continued)

OTHER PUBLICATIONS

Mar. 11, 2015 Search Report issued in European Application No. 14 15 8097.
(Continued)

*Primary Examiner* — Sarang Afzali
*Assistant Examiner* — Darrell C Ford
(74) *Attorney, Agent, or Firm* — Oliff PLC

(57) ABSTRACT

A gas turbine engine comprises a compressor, a combustion chamber, an outer casing, an inner casing and a cooling arrangement. The outer casing surrounds the compressor and the combustion chamber and the combustion chamber has turbine nozzle guide vanes. The compressor has load carrying outlet guide vanes connected to the outer casing and the inner casing. The turbine nozzle guide vanes connect the outer casing and the inner casing. The cooling arrangement comprises a cooling air duct located between the compressor and the combustion chamber. The compressor outlet guide vanes carry at least one aerodynamic fairing. A support structure supports the cooling air duct from the inner casing at two spaced positions and the support structure forms a chamber with the inner casing. The support structure comprises at least one hollow duct and each hollow duct locates behind a respective one of the aerodynamic fairings.

22 Claims, 3 Drawing Sheets

(51) Int. Cl.
    *F03D 11/00* (2006.01)
    *F01D 25/12* (2006.01)
    *F01D 9/06* (2006.01)
    *F01D 5/08* (2006.01)
    *F01D 25/24* (2006.01)
    *F02C 6/08* (2006.01)
    *F02C 7/18* (2006.01)
    *F04D 29/54* (2006.01)
    *F04D 29/32* (2006.01)

(52) U.S. Cl.
    CPC ............ *F01D 25/246* (2013.01); *F02C 6/08* (2013.01); *F02C 7/185* (2013.01); *F04D 29/321* (2013.01); *F04D 29/542* (2013.01); *F05D 2240/90* (2013.01); *F05D 2260/213* (2013.01); *Y02T 50/671* (2013.01); *Y02T 50/673* (2013.01); *Y02T 50/676* (2013.01)

(58) Field of Classification Search
    CPC ...... F02C 7/18; F02C 7/185; F05D 2260/213; F05D 2260/12; F04D 29/542; F04D 29/582; F04D 29/5826
    USPC ............ 415/115–116, 175–179, 134, 136, 415/138–139
    See application file for complete search history.

(56) References Cited

U.S. PATENT DOCUMENTS

| | | | |
|---|---|---|---|
| 4,183,207 A | | 1/1980 | Libertini |
| 5,123,242 A | * | 6/1992 | Miller ............ F02C 7/14 165/300 |
| 5,156,525 A | * | 10/1992 | Ciokajlo ............ F01D 11/001 415/190 |
| 5,163,285 A | | 11/1992 | Mazeaud et al. |
| 5,249,921 A | | 10/1993 | Stueber et al. |
| 5,269,133 A | * | 12/1993 | Wallace ............ F02C 7/185 165/142 |
| 5,292,227 A | | 3/1994 | Czachor et al. |
| 5,609,467 A | | 3/1997 | Lenhart et al. |
| 5,619,855 A | * | 4/1997 | Burrus ............ F23R 3/02 60/262 |
| 2005/0268617 A1 | * | 12/2005 | Amond, III ............ F02C 9/34 60/776 |
| 2007/0116562 A1 | * | 5/2007 | West ............ F01D 5/187 415/208.1 |
| 2008/0245073 A1 | * | 10/2008 | Holland ............ F02C 6/18 60/736 |
| 2008/0276622 A1 | * | 11/2008 | Johnson ............ F23R 3/14 60/800 |
| 2009/0260342 A1 | * | 10/2009 | Ishiguro ............ F02C 1/04 60/39.511 |
| 2010/0031673 A1 | * | 2/2010 | Maltson ............ F01D 9/041 60/796 |
| 2010/0207379 A1 | | 8/2010 | Olver |
| 2010/0303610 A1 | | 12/2010 | Wang et al. |
| 2011/0088405 A1 | * | 4/2011 | Turco ............ F01D 5/081 60/782 |
| 2011/0192166 A1 | * | 8/2011 | Mulcaire ............ G08G 1/01 60/751 |
| 2012/0128467 A1 | * | 5/2012 | Ruthemeyer ............ F01D 5/146 415/115 |
| 2012/0151928 A1 | * | 6/2012 | Patel ............ F23D 11/383 60/737 |
| 2016/0237950 A1 | * | 8/2016 | Burd ............ B32B 3/10 |
| 2018/0080476 A1 | * | 3/2018 | McCune ............ F04D 29/063 |

FOREIGN PATENT DOCUMENTS

| | | |
|---|---|---|
| GB | 630277 | 10/1949 |
| GB | 873969 | 8/1961 |

OTHER PUBLICATIONS

Sep. 24, 2013 British Search Report issued in British Application No. 1305432.5.

* cited by examiner

GAS TURBINE ENGINE COOLING ARRANGEMENT

FIELD OF THE INVENTION

The present invention relates to a gas turbine engine cooling arrangement and in particular relates to a turbofan gas turbine engine cooling arrangement.

BACKGROUND TO THE INVENTION

The efficiency of a gas turbine engine is maximised by operating the gas turbine engine at the highest temperature and pressure possible. However, this objective is limited by the temperature capability of the materials from which the components of the gas turbine engine are manufactured. The components, combustion chamber components and turbine components, of the gas turbine engine operating at the highest temperatures are generally cooled using air bled from a compressor of the gas turbine engine to increase the operating temperature limit. However, the air bled from the compressor is already at a high pressure and a high temperature and thus the potential for cooling these components is limited.

The air bled from the compressor may be cooled prior to being supplied to the components to be cooled, so that the maximum operating temperature of the gas turbine engine may be increased and consequently the efficiency increased. The air bled from the compressor and cooled in this manner is generally known as cooled cooling air. A typical arrangement supplies air bled from the compressor of the gas turbine engine through a duct to a heat exchanger and then supplies the cooled air through another duct or ducts to the components of the gas turbine engine to be cooled. The heat exchanger may transfer heat from the air bled from the compressor to air in a bypass duct of a turbofan gas turbine engine or may transfer heat to fuel supplied to the gas turbine engine.

A turbine disc, for example a high pressure turbine disc, of the gas turbine engine is one of the components of the gas turbine engine which requires cooling. The cooled cooling air must be supplied across the flow path of the core of the gas turbine engine as part of the ducting process. One means of accomplishing this is to flow the air through hollow vanes, or hollow struts, across the compressor exit diffuser. The hollow vanes, or hollow struts, may be the compressor high pressure outlet guide vanes or structural struts.

Large rearward loads are typically exerted by the structure used to mount the high pressure turbine nozzle guide vanes which is transferred by the compressor high pressure outlet guide vanes or structural struts into the engine casing. Thus the high pressure outlet guide vanes or structural struts perform a major structural duty. The cooled cooling air is significantly cooler than the air supplied from the compressor exit diffuser to the combustion chamber of the gas turbine engine. Thus, there would be a large temperature differential across the wall of any hollow vanes, or hollow struts, extending across the compressor exit diffuser. This temperature differential will induce further stresses into structural vanes, or structural struts, which are already carrying significant structural loads from the high pressure nozzle guide vanes.

These thermally induced stresses may significantly reduce the operating life of the compressor high pressure outlet guide vanes or structural struts in the compressor exit diffuser. The provision of a manifold radially outwardly of the high pressure outlet guide vanes may make the system complicated and difficult to manufacture and may result in the manufacture of a separate ring of high pressure outlet guide vanes and a separate ring of hollow struts which are bolted together and this may increase the weight of the gas turbine engine and may introduce a step in the inner and/or outer surfaces of the compressor exit diffuser which may produce a loss of aerodynamic performance.

Therefore the present invention seeks to provide a novel gas turbine engine cooling arrangement which reduces or overcomes the above mentioned problem.

STATEMENTS OF INVENTION

Accordingly the present invention provides a gas turbine engine comprising a compressor, a combustion chamber, an outer casing, an inner casing and a cooling arrangement, the outer casing surrounding the compressor and the combustion chamber, the combustion chamber having turbine nozzle guide vanes, the compressor having load carrying outlet guide vanes connected to the outer casing and the inner casing, the turbine nozzle guide vanes being connected to the inner casing to transmit loads via the compressor outlet guide vanes to the outer casing, the cooling arrangement comprising a cooling air duct located between the compressor and the combustion chamber, the compressor outlet guide vanes carrying at least one aerodynamic fairing, a support structure to support the cooling air duct from the inner casing, the support structure forming a chamber with the inner casing, the support structure comprising at least one hollow duct and each hollow duct locating behind a respective one of the aerodynamic fairings.

The compressor outlet guide vanes may carry a plurality of aerodynamic fairings and the support structure comprising a plurality of hollow ducts.

The cooling air duct may comprise an annular manifold or a part annular manifold and the support structure may be arranged around the inner casing to form an annular chamber with the inner casing.

The inner casing may have at least one aperture to supply cooling air to a cool a combustion chamber component or a turbine component.

The gas turbine engine having a turbine disc and the at least one aperture in the inner casing may supply cooling air from the chamber to cool the turbine disc.

The support structure may have a first end and a second end. The second end of the support structure may have a flange which is secured to a flange of the inner casing. The second end of the support structure may locate in a slot in the inner casing to form a sliding joint. A ring seal may be provided between the second end of the support structure and the inner casing. A ring seal may be provided between the first end of the support structure and the inner casing.

Each of the ring seals may be a piston ring seal, a brush seal, a labyrinth seal or other suitable seal.

The cooling air duct may be supported from the outer casing.

The cooling arrangement may comprise a supply duct, a heat exchanger and a return duct, the supply duct being arranged to supply air from the compressor to the heat exchanger and the return duct being arranged to return cool air from the heat exchanger to the cooling air duct, The gas turbine engine may be a turbofan gas turbine engine having a bypass duct and the heat exchanger may be arranged in the bypass duct of the turbofan gas turbine engine.

The gas turbine engine may have a fuel system, the heat exchanger may be arranged in the fuel system of the gas turbine engine.

BRIEF DESCRIPTION OF THE DRAWINGS

The present invention will be more fully described by way of example with reference to the accompanying drawings, in which.

DETAILED DESCRIPTION

Figure 1:
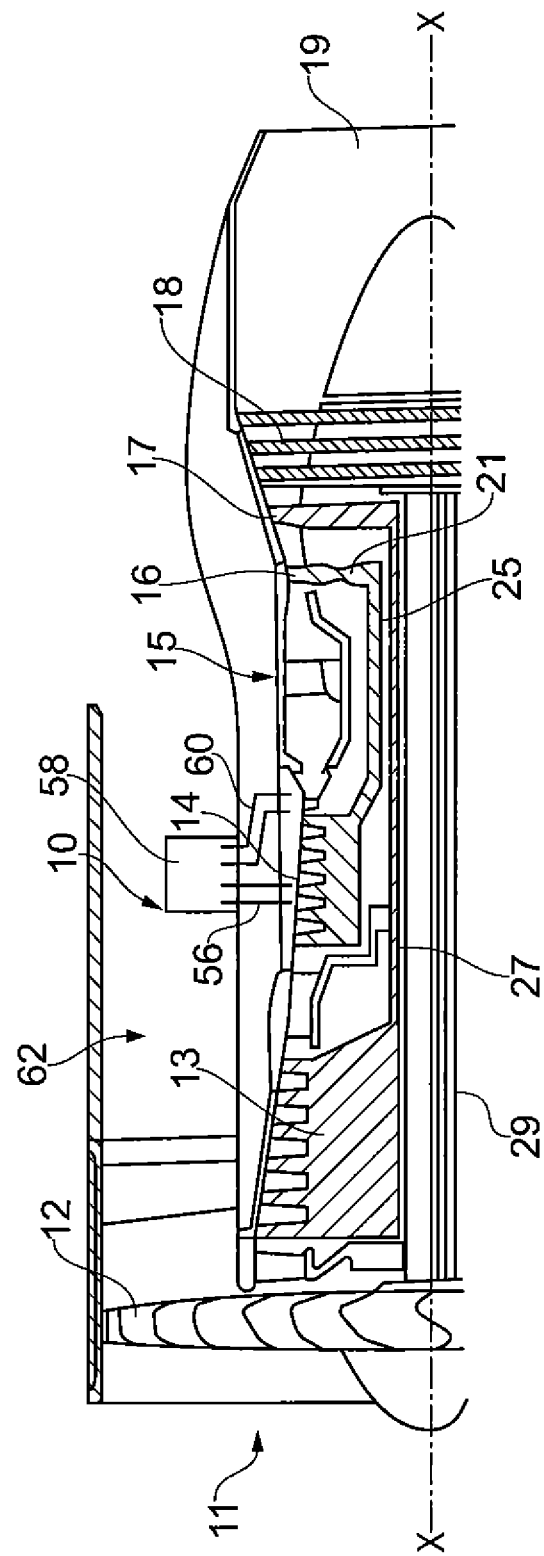
FIG. 1 is partially cut away view of a turbofan gas turbine engine having a cooling arrangement according to the present invention.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 25. The intermediate pressure turbine 17 is arranged to drive the intermediate pressure compressor 13 via a second shaft 27 and the low pressure turbine 18 is arranged to drive the fan 12 via a third shaft 29. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine and flows through a bypass duct 62 to provide propulsive thrust.

Figure 2:
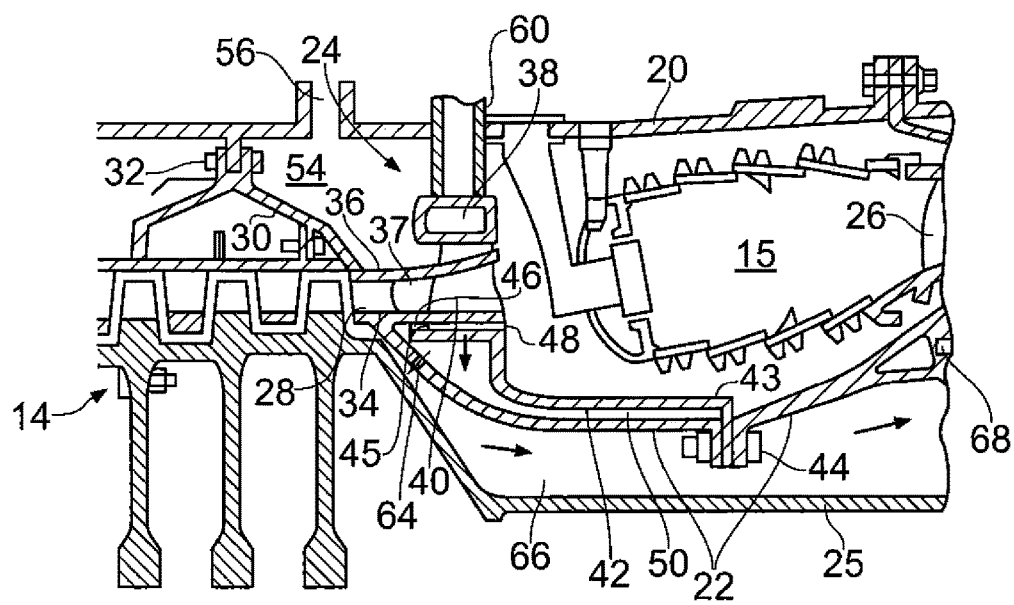
FIG. 2 is an enlarged cross-sectional view of the turbofan gas turbine engine of FIG. 1 showing a cooling arrangement according to the present invention.
Figure 3:
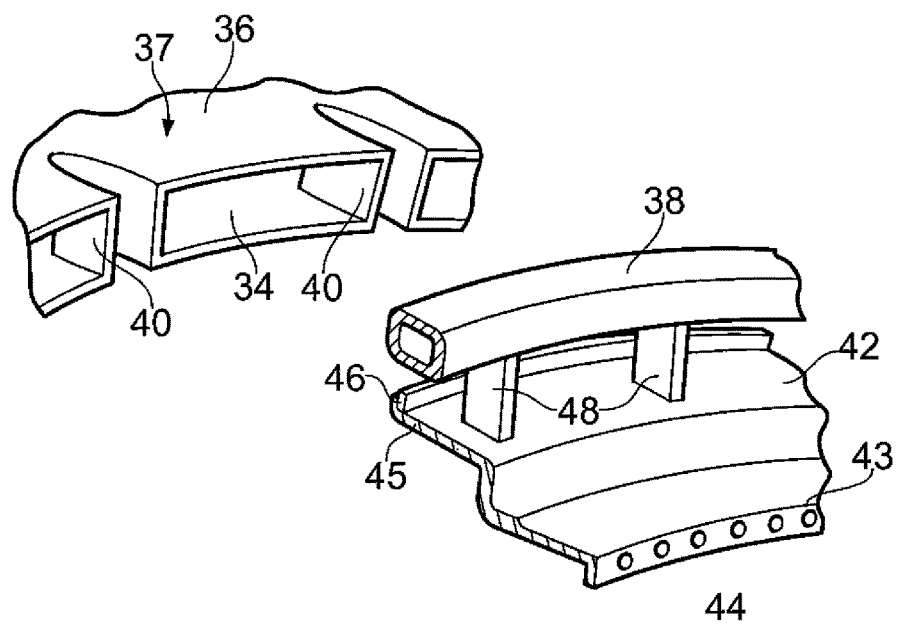
FIG. 3 is an exploded perspective view of the cooling arrangement shown in FIG. 2.

The turbofan gas turbine engine 10, as shown more clearly in FIGS. 2 and 3, comprises an outer casing 20, an inner casing 22 and a cooling arrangement 24. The outer casing 20 surrounds the high pressure compressor 14 and the combustion chamber 15. The combustion chamber 15 has turbine nozzle guide vanes 26 at its axially downstream end. The high pressure compressor 14 has load carrying compressor outlet guide vanes 28 connected to the outer casing 20 and the inner casing 22 and in particular the radially outer ends of the compressor outlet guide vanes 28 are connected to the outer casing 20 and the radially inner ends of the compressor outlet guide vanes 28 are connected to the inner casing 22. The turbine nozzle guide vanes 26 also connect the outer casing 20 and the inner casing 22 and in particular the radially outer ends of the turbine nozzle guide vanes 26 are connected to the outer casing 20 and the radially inner ends of the turbine nozzle guide vanes 26 are connected to the inner casing 22. The radially outer ends of the compressor outlet guide vanes 28 are connected to the outer casing 20 by a support structure 30 and the support structure 30 is secured to the outer casing 20 by a flanged joint 32. The compressor outlet guide vanes 28 extend radially between a radially inner wall 34 and a radially outer wall 36. The radially inner and outer walls 34 and 36 of the compressor outlet guide vanes 28 extend in a downstream direction towards the combustion chamber 15 and diverge away from each other in a downstream direction to form a diffuser 37. The high pressure turbine 16 comprises a high pressure turbine disc 21.

The cooling arrangement 24 comprises a cooling air manifold, for example an annular cooling air manifold, 38 located axially between the high pressure compressor 14 and the combustion chamber 15 and located radially between the diffuser 37 of the high pressure compressor 14 and the outer casing 20. The compressor outlet guide vanes 28 carry a plurality of aerodynamic fairings 40, the aerodynamic fairings 40 are positioned axially downstream of the compressor outlet guide vanes 28 and extend radially between the radially inner wall 34 and the radially outer wall 36 in the diffuser 37. The cooling arrangement 24 comprises a support structure 42 provided to support the cooling air manifold 38 from the inner casing 22 and the support structure 42 supports the cooling air manifold 38 from the inner casing 22 at two spaced positions. In this example the support structure 42 supports the cooling air manifold 38 from the inner casing 22 at two axially spaced positions and in particular an axially downstream end 43 of the support structure 42 is secured to the inner casing 22 by a flanged joint 44 and the axially upstream end 45 of the support structure 42 is mounted on the radially inner wall 34 of the compressor outlet guide vanes 28 by a seal 46. The cooling arrangement 24 also comprises a plurality of hollow ducts 48 and each hollow duct 48 locates behind a respective one of the aerodynamic fairings 40. Each hollow duct 48 extends radially across the diffuser 37 from the cooling air manifold 38 to the support structure 42 and within and behind the respective one of the aerodynamic fairings 40. The support structure 42 forms a chamber, for example an annular chamber, 50 with the inner casing 22. The inner casing 22 surrounds the first shaft 25 to form an annular chamber 66 and the inner casing 22 has a plurality of apertures 64 extending there-through interconnecting the annular chamber 50 and the annular chamber 66. The downstream end of the annular chamber 66 has a plurality of nozzles 68 to direct cooling air onto the high pressure turbine disc 21. The seal 46 is a ring seal and may be a piston seal, a brush seal or a labyrinth seal or any other suitable seal.

A chamber 54 is defined by the casing 20 and the high pressure compressor 14 is arranged to supply air into the chamber 54. A duct 56 is provided to supply air from the chamber 54 to a heat exchanger 58 and a duct 60 is provided to return the air, after cooling in the heat exchanger 58, to the cooling air manifold 38. The heat exchanger 58 is positioned in the bypass duct 62 of the turbofan gas turbine engine 10. In this particular arrangement the air supplied to the chamber 54 is at the high pressure compressor 14 delivery pressure, e.g. the air is supplied from the outlet, at the downstream end, of the high pressure compressor 14 through the diffuser 37 into the chamber 54. It may be possible to bleed and supply air from other suitable regions of the high pressure compressor 14 if they are at a high enough pressure to drive air through the cooling arrangement 24.

In operation of the turbofan gas turbine engine 10 air is supplied from the high pressure compressor 14 to the heat exchanger 58 via the chamber 54 and the duct 56. The air flowing through the bypass duct 62 cools the bleed air flowing through the heat exchanger 58. The cooled bleed air is supplied from the heat exchanger 58 to the cooling air manifold 38 via the duct 60. The cooled bleed air is supplied through the hollow ducts 48 radially across the diffuser 37 to the annular chamber 50. The cooled bleed air is then supplied through the apertures 64 in the inner casing 22 to the annular chamber 66 and then to the nozzles 68 to direct the cooled bleed air onto the high pressure turbine disc 21 to cool the high pressure turbine disc 21. The cooled bleed air may be used to cool other turbine components and/or other combustion chamber components.

The present invention provides means, hollow ducts 48, to duct the cooled bleed air, cooled cooling air, across the compressor diffuser 37 utilising the compressor outlet guide vanes 28 to transfer the structural loads from the turbine nozzle guide vanes 26 whilst isolating the cooled bleed air, cooled cooling air, hollow ducts 48 from severe temperature gradients and the turbine nozzle guide vanes 26 structural loads. This is accomplished by employing the aerodynamic fairings 40 in the diffuser 37. The aerodynamic fairings 40 are similar to struts but have an open downstream end. The separate hollow ducts 48 are located within the aerodynamic fairings 40 and are used to transport the cooled bleed air, cooled cooling air. Alternatively, the aerodynamic fairings 40 may have a downstream to fully enclose the hollow ducts 48.

The duct, or ducts, 60 used to supply the cooled bleed air, cooled cooling air, to the annular manifold 38 may be joined to the annular manifold 38 or to themselves by flexible seals to accommodate relative movement between the ducts 60 which are carried by and/or connected to the outer casing 20 and the annular manifold 38, the hollow ducts 48 and the support structure 42 which are carried/supported by the inner casing 22. The annular manifold 38, the hollow ducts 48 and the support structure 42 are free to expand and contract independently of the inner casing 22 because the only contact is through the flanged joint 44. Thus no external structural loads are imposed on the annular manifold 38, hollow ducts 48 and support structure 42. The aerodynamic fairings 40 shield the hollow ducts 48 from the high temperature air flowing out of the high pressure compressor 14 through the compressor outlet guide vanes 28 and diffuser 37 and reduce the temperature differential across the hollow ducts 48 thereby reducing any stresses induced by the differential temperatures and also reduce or prevent the transfer of heat from the air flowing through the diffuser 37 to the cooled bleed air, cooled cooling air, thus increasing the system performance. Similarly, the interior surface of the aerodynamic fairings 40 are subject to low velocity air, or stagnant air, thereby significantly reducing any stress-induced temperature differential across the aerodynamic fairings 40. The aerodynamic fairings 40 also protect the hollow ducts 40 from any foreign object damage thus improving reliability of the cooled bleed air, cooled cooing air system.

The hollow ducts 48 are mounted on a continuous support structure 42 which forms the chamber 50 with the inner casing 22 and the chamber 50 is used to transport the cooled bleed air, cooled cooling air, to the turbine component(s) or the combustion component(s) requiring cooling. The seal 46 provided between the support structure 42 and the radially inner wall 34 of the compressor outlet guide vanes 26 ensures that there is no leakage of compressor delivery air into the chamber 50 which would increase the temperature of the cooled bleed air, cooled cooling air, and reduce the system efficiency.

Although the manifold 38 has been described as being an annular manifold it may be possible to use a plurality of part annular manifolds each with closed ends and each manifold has one or more hollow ducts 48 to supply cooled bleed air to the chamber 50. The use of a plurality of separate manifolds may eliminate any 'fight' with the continuous support structure 42 which may occur with a continuous manifold. Alternatively, ducts 60 may be connected to each individual hollow duct 48 instead of employing a manifold.

It is also to be noted that the radially inner and outer walls 34 and 36 respectively of the compressor outlet guide vanes 28 and diffuser 37 provide a continuous inner and outer wall for the compressor delivery air, without any aerodynamic steps which would reduce aerodynamic efficiency.

The upstream end of the inner casing 22 and the flanged joint 44 is shielded from the heat from the high pressure compressor 14 delivery air and the heat from the combustion chamber 15 by the support structure 42. This reduces the operating temperature of the upstream end of the inner casing 22 and the flanged joint 44, thus potentially yielding a life benefit.

The present invention provides a means of transferring cooled cooling air across the diffuser which is independent of the high pressure compressor outlet guide vanes and the means is not subject to high temperature differentials and is not subject to external structural loads. The present invention also avoids any splits across the diffuser walls thus providing a cleaner aerodynamic surface for the compressor delivery air and also should reduce the heat picked up by the cooled bleed air, cooled cooling air, thus improving the cooling performance of the system.

As the annular manifold 38, hollow ducts 48 and support structure 42 do not carry structural loads, then the material employed for these components does not have to be a high temperature, high strength material which then facilitates the use of a cheaper, less strong, material with adequate temperature capability which is easily fabricated thus enabling the use of low cost manufacturing techniques. In addition, the high pressure compressor outlet guide vanes 28 structure casting may be less complicated, thus giving a cost reduction and less non-conforming product.

Figure 4:
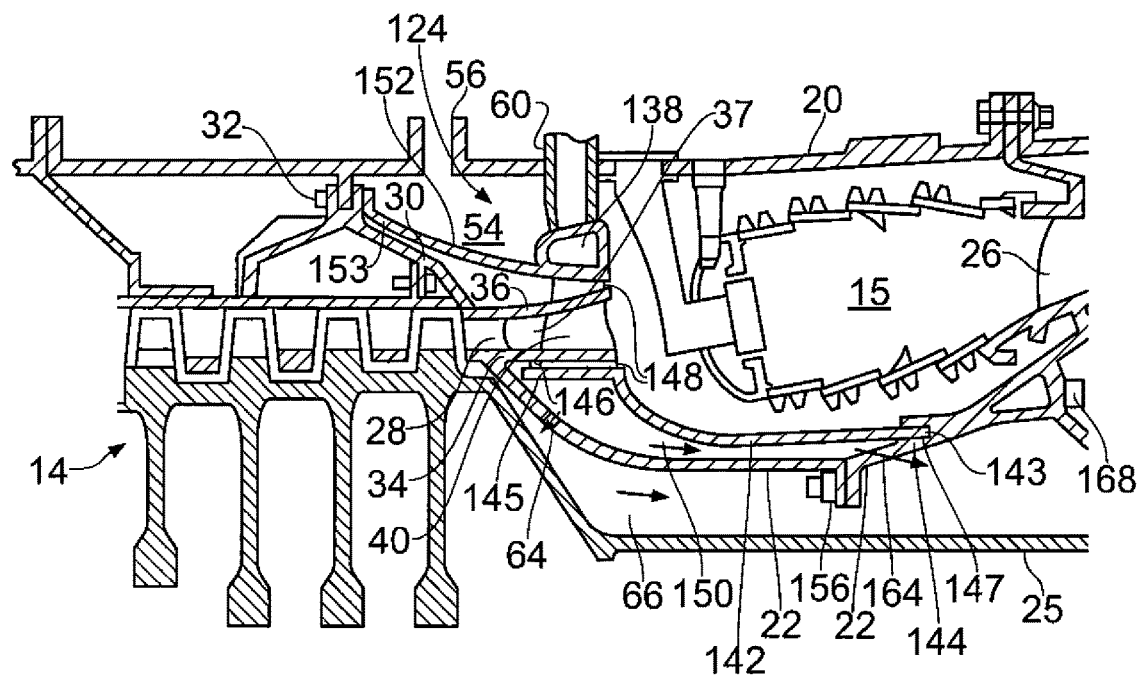
FIG. 4 is an enlarged cross-sectional view of the turbofan gas turbine engine of FIG. 1 showing an alternative cooling arrangement according to the present invention.

A further cooling arrangement 124 according to the present invention is shown in FIG. 4. The cooling arrangement 124 is similar to that shown in FIGS. 2 and 3. The cooling arrangement 124 comprises a cooling air manifold, for example an annular cooling air manifold, 138 located axially between the high pressure compressor 14 and the combustion chamber 15 and located radially between the diffuser 37 of the high pressure compressor 14 and the outer casing 20. The compressor outlet guide vanes 28 carry a plurality of aerodynamic fairings 40, the aerodynamic fairings 40 are positioned axially downstream of the compressor outlet guide vanes 28 and extend radially between the radially inner wall 34 and the radially outer wall 36 in the diffuser 37. The cooling arrangement comprise 124 a support structure 142 provided to support the cooling air manifold 138 from the inner casing 22 and the support structure 142 supports the cooling air manifold 138 from the inner casing 22 at two spaced positions. In this example the support structure 142 supports the cooling air manifold 138 from the inner casing 22 at two axially spaced positions and in particular an axially downstream end 143 of the support structure 142 is secured to the inner casing 22 by a sliding joint 144 and the axially upstream end 145 of the support structure 142 is mounted on the radially inner wall 34 of the compressor outlet guide vanes 28 by a seal 146. The downstream end 143 of the support structure 142 locates in an annular slot 147 in the inner casing 22 so that relative axial movement is permitted between the inner casing 22 and the support structure 142. The cooling arrangement 124 also comprises a plurality of hollow ducts 148 and each hollow duct 148 locates behind a respective one of the aerodynamic fairings 40. Each hollow duct 148 extends radially across the diffuser 37 from the cooling air manifold 138 to the support structure 142 and within and behind the respective one of the aerodynamic fairings 40. The support structure 142 forms a chamber, for example an annular chamber, 150 with the inner casing 22. The inner casing 22 surrounds the first shaft 25 to form an annular chamber 66 and the inner casing 22 has a plurality of apertures 64 extending there-through interconnecting the annular chamber 50 and the annular chamber 66 and has another plurality of apertures 164 extending there-through interconnecting the annular chamber 50 and the annular chamber 66. The downstream end of the annular chamber 66 has a plurality of nozzles 68 to direct cooling air onto the high pressure turbine disc 21. An additional support structure 152 is provided to support the cooling air manifold 138 from the outer casing 20 and in particular an upstream end 153 of the additional support structure 152 is secured to the outer casing 20 by the flanged joint 32. The axially downstream end of the additional support structure 152 is secured to the cooling air manifold 138. The seal 146 is a ring seal and may be a piston ring seal, a brush seal or a labyrinth seal or any other suitable seal.

A chamber 54 is defined by the casing 20 and the high pressure compressor 14 is arranged to supply air into the chamber 54. A duct 56 is provided to supply air from the chamber 54 to a heat exchanger 58 and a duct 60 is provided to return the air, after cooling in the heat exchanger 58, to the cooling air manifold 38. The heat exchanger 58 is positioned in the bypass duct 62 of the turbofan gas turbine engine 10. In this particular arrangement the air supplied to the chamber 54 is at the high pressure compressor 14 delivery pressure, e.g. the air is supplied from the outlet, at the downstream end, of the high pressure compressor 14 through the diffuser 37 into the chamber 54. It may be possible to bleed and supply air from other suitable regions of the high pressure compressor 14 if they are at a high enough pressure to drive air through the cooling arrangement 24.

In this cooling arrangement 124 the additional support structure 152 may comprise a continuous frusto-conical casing or may comprise a plurality of beams extending from the flanged joint 32. The use of a plurality of beams would improve stressing during transient thermal loading and also reduce weight. In addition, the downstream end 143 of the support structure 142 interfaces with the inner casing 22 via a sliding joint 144 positioned axialy downstream of flanged joint 156 connecting portions of the inner casing 22. This enables annular chamber 150 to have a longer axial length and the cooled bleed air, cooled cooling air, may be supplied through the apertures 164 into the annular chamber 66. The flanged joint 156 connecting portions of the inner casing 22 is completely shielded from the combustion chamber 15 air. The cooled bleed air, cooled cooling air, is able to flow over and cool the flanged joint 156 as it flow to the apertures 164.

The cooling arrangement 124 of FIG. 4 operates in substantially the same manner as that described in FIGS. 2 and 3.

Figure 5:
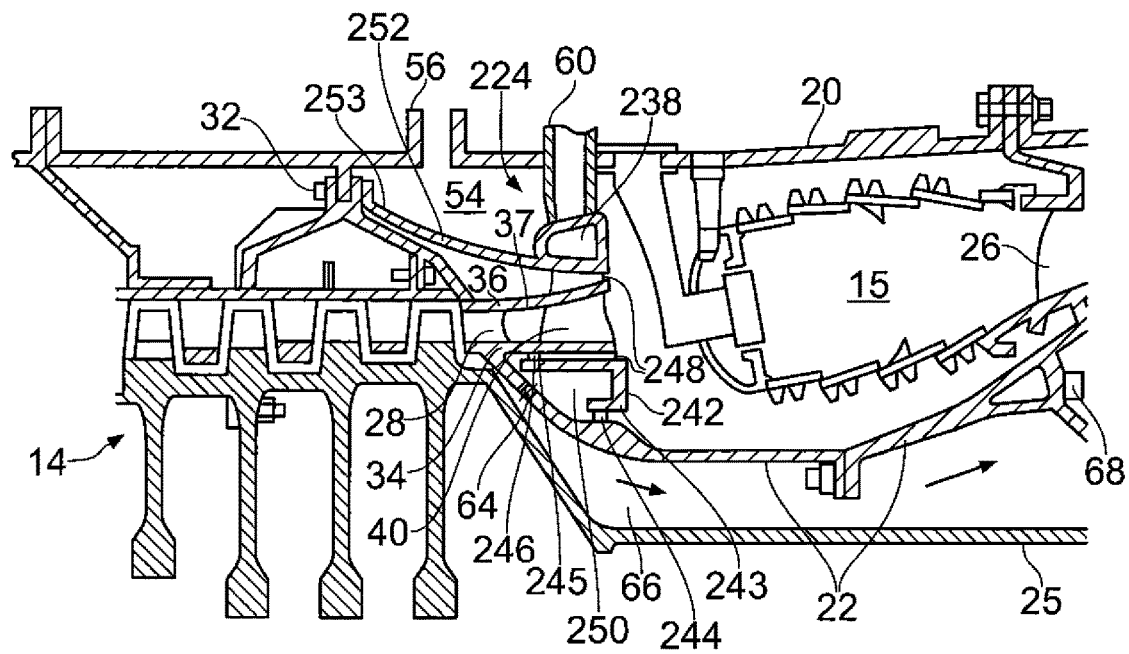
FIG. 5 is an enlarged cross-sectional view of the turbofan gas turbine engine of FIG. 1 showing a further cooling arrangement according to the present invention.

A further cooling arrangement 224 according to the present invention is shown in FIG. 5. The cooling arrangement 224 is similar to that shown in FIGS. 2 and 3. The cooling arrangement 224 comprises a cooling air manifold, for example an annular cooling air manifold, 238 located axially between the high pressure compressor 14 and the combustion chamber 15 and located radially between the diffuser 37 of the high pressure compressor 14 and the outer casing 20. The compressor outlet guide vanes 28 carry a plurality of aerodynamic fairings 40, the aerodynamic fairings 40 are positioned axially downstream of the compressor outlet guide vanes 28 and extend radially between the radially inner wall 34 and the radially outer wall 36 in the diffuser 37. The cooling arrangement 224 comprises a support structure 242 provided to support the cooling air manifold 238 from the inner casing 22 and the support structure 242 supports the cooling air manifold 238 from the inner casing 22 at two spaced positions. In this example the support structure 242 supports the cooling air manifold 238 from the inner casing 22 at two axially spaced positions and in particular an axially downstream end 243 of the support structure 242 is mounted on the inner casing 22 by a seal 244 and the axially upstream end 245 of the support structure 242 is mounted on the radially inner wall 34 of the compressor outlet guide vanes 28 by a seal 246. The cooling arrangement 224 also comprises a plurality of hollow ducts 248 and each hollow duct 248 locates behind a respective one of the aerodynamic fairings 40. Each hollow duct 248 extends radially across the diffuser 37 from the cooling air manifold 238 to the support structure 242 and within and behind the respective one of the aerodynamic fairings 40. The support structure 242 forms a chamber, for example an annular chamber, 250 with the inner casing 22. The inner casing 22 surrounds the first shaft 25 to form an annular chamber 66 and the inner casing 22 has a plurality of apertures 64 extending there-through interconnecting the annular chamber 250 and the annular chamber 66. The downstream end of the annular chamber 66 has a plurality of nozzles 68 to direct cooling air onto the high pressure turbine disc 21. An additional support structure 252 is provided to support the cooling air manifold 238 from the outer casing 20 and in particular an upstream end 253 of the additional support structure 252 is secured to the outer casing 20 by the flanged joint 32. The axially downstream end of the additional support structure 252 is secured to the cooling air manifold 238. The seals 244 and 246 are ring seals and may be piston ring seals, brush seals or labyrinth seals or any other suitable seals.

A chamber 54 is defined by the casing 20 and the high pressure compressor 14 is arranged to supply air into the chamber 54. A duct 56 is provided to supply air from the chamber 54 to a heat exchanger 58 and a duct 60 is provided to return the air, after cooling in the heat exchanger 58, to the cooling air manifold 38. The heat exchanger 58 is positioned in the bypass duct 62 of the turbofan gas turbine engine 10. In this particular arrangement the air supplied to the chamber 54 is at the high pressure compressor 14 delivery pressure, e.g. the air is supplied from the outlet, at the downstream end, of the high pressure compressor 14 through the diffuser 37 into the chamber 54. It may be possible to bleed and supply air from other suitable regions of the high pressure compressor 14 if they are at a high enough pressure to drive air through the cooling arrangement 24.

In the cooling arrangement 224 the additional support structure 252 may also comprise a continuous frusto-conical casing or may comprise a plurality of beams extending from the flanged joint 254. The use of a plurality of beams would improve stressing during transient thermal loading and also reduce weight.

The cooling arrangement 224 of FIG. 5 operates in substantially the same manner as that described in FIGS. 2 and 3.

A further cooling arrangement according to the present invention, not shown, is similar to that shown in FIGS. 2 and 3. The cooling arrangement is similar to that in FIGS. 2 and 3 in that the support structure is secured to the inner casing by a flanged joint. The cooling arrangement is similar to that in FIG. 4 in that the downstream end of the support structure locates in an annular slot in the inner casing so that relative axial movement is permitted between the downstream end of the inner casing and the support structure. In addition a radially inwardly extending flange of the support structure which forms the flanged joint has a plurality of circumferentially spaced apertures arranged radially between the inner casing and the support structure. The inner casing has a plurality of apertures positioned downstream of the flanged joint, as in FIG. 4, to allow the air to flow from the chamber between the inner casing and the support structure through the apertures in the flange and then through the apertures in the inner casing to the nozzles to direct cooling air onto the high pressure turbine disc. This cooling arrangement may be used with or without the additional support structure shown in FIG. 4.

In an additional cooling arrangement of the present invention, not shown, it may be possible to use the support structure 42 shown in FIGS. 2 and 3 with the additional support structure 152 shown in FIG. 4.

Although the present invention has been described with reference to a turbofan gas turbine engine having a bypass duct and the heat exchanger may be arranged in the bypass duct of the turbofan gas turbine engine, it may be possible to position the heat exchanger in other positions on the gas turbine engine or associated aircraft, ship, land vehicle or building such that it is cooled by air. Alternatively the fuel in the gas turbine engine fuel system may be used to cool the bleed air from the compressor in which case the heat exchanger is arranged in the fuel system of the gas turbine engine and the air supplied by the compressor is cooled by the fuel. Additionally the air supplied by the compressor may be cooled by water in the case of an industrial or marine gas turbine engine.

Although the support structure has been described as being annular and arranged around the inner casing to form an annular chamber with the inner casing, it may be possible for the support structure to comprise part annular segments to form a plurality of chambers with the inner casing.

The present invention is applicable to any type of gas turbine engine, for example a turbofan gas turbine engine, a turbojet gas turbine engine, a turboprop gas turbine engine or turboshaft gas turbine engine and is applicable to aero gas turbine engines, industrial gas turbine engines, marine gas turbine engines and automotive gas turbine engines.

The invention claimed is:

1. A gas turbine engine comprising a compressor, a diffuser, a combustion chamber, an outer casing, an inner casing and a cooling arrangement, the outer casing surrounding the compressor, the diffuser and the combustion chamber, the combustion chamber having turbine nozzle guide vanes, the compressor having structural load carrying compressor outlet guide vanes connected to the outer casing and the inner casing, the compressor outlet guide vanes extending radially between and in contact with an inner wall and an outer wall, the inner wall and the outer wall diverging away from each other to form the diffuser, the turbine nozzle guide vanes being connected to the inner casing to transmit structural loads via the compressor outlet guide vanes to the outer casing, the cooling arrangement comprising a cooling air duct located between the compressor and the combustion chamber, the cooling arrangement being located radially between the outer wall and the outer casing, the diffuser being arranged axially between the compressor and the combustion chamber, the compressor outlet guide vanes supporting at least one aerodynamic fairing, the at least one aerodynamic fairing extending radially across the diffuser, the at least one aerodynamic fairing extending radially between the inner wall and the outer wall, a first support structure to support the cooling air duct from the inner casing, the first support structure forming a chamber with the inner casing, the first support structure comprising at least one hollow duct, each hollow duct at least one hollow duct being located within and behind a respective one of the at least one aerodynamic fairings, the at least one hollow duct extending radially across the diffuser from the cooling air duct to the first support structure, the at least one hollow duct extending through the respective one of the at least one aerodynamic fairings, and the cooling air duct, the at least one hollow duct, and the support structure being free to expand and contract independently of the inner casing.

2. The gas turbine engine as claimed in claim 1 wherein the compressor outlet guide vanes carries a plurality of aerodynamic fairings and the support structure comprises a plurality of hollow ducts.

3. The gas turbine engine as claimed in claim 1 wherein the cooling air duct comprises an annular manifold and the support structure is arranged around and surrounds the inner casing to form an annular chamber with the inner casing.

4. The gas turbine engine as claimed in claim 1 wherein the cooling air duct comprises a part annular manifold and the support structure is arranged around and surrounds the inner casing to form an annular chamber with the inner casing.

5. The gas turbine engine as claimed in claim 1 wherein the inner casing comprises at least one aperture to supply cooling air to cool a component, and the component is selected from the group consisting of a combustion chamber component and a turbine component.

6. The gas turbine engine as claimed in claim 5 wherein the turbine component comprises a turbine disc and the at least one aperture in the inner casing is arranged to supply cooling air from the chamber to cool the turbine disc.

7. The gas turbine engine as claimed in claim 1 wherein the support structure comprises a first end and a second end.

8. The gas turbine engine as claimed in claim 7 wherein the inner casing comprises a flange, and the second end of the support structure comprises a flange that is secured to the flange of the inner casing.

9. The gas turbine engine as claimed in claim 7 wherein the inner casing comprises a slot, and the second end of the support structure is located in the slot in the inner casing to form a sliding joint.

10. The gas turbine engine as claimed in claim 7 further comprising a ring seal provided between the second end of the support structure and the inner casing.

11. The gas turbine engine as claimed in claim 10 wherein the ring seal is selected from the group consisting of a piston ring seal, a brush seal and a labyrinth seal.

12. The gas turbine engine as claimed in claim 7 further comprising a ring seal provided between the first end of the support structure and the inner casing.

13. The gas turbine engine as claimed in claim 12 wherein the ring seal is selected from the group consisting of a piston ring seal, a brush seal and a labyrinth seal.

14. The gas turbine engine as claimed in claim 1 wherein the cooling air duct is supported from the outer casing.

15. The gas turbine engine as claimed in claim 1 wherein the cooling arrangement comprises a supply duct, a heat exchanger and a return duct, where the supply duct is arranged to supply air from the compressor to the heat exchanger, and the return duct is arranged to return cool air from the heat exchanger to the cooling air duct.

16. The gas turbine engine as claimed in claim 15, wherein
the gas turbine engine is a turbofan gas turbine engine having a bypass duct and the heat exchanger is arranged to exchange heat with air in the bypass duct of the turbofan gas turbine engine.

17. The gas turbine engine as claimed in claim 15, further comprising a fuel system, wherein the heat exchanger is arranged to exchange heat with fuel in the fuel system of the gas turbine engine.

18. The gas turbine engine as claimed in claim 1 wherein the at least one aerodynamic fairing has an open downstream end.

19. A gas turbine engine comprising a compressor, a diffuser, a combustion chamber, an outer casing, an inner casing and a cooling arrangement,
the outer casing surrounding the compressor, the diffuser and the combustion chamber,
the combustion chamber having turbine nozzle guide vanes,
the compressor having structural load carrying compressor outlet guide vanes connected to the outer casing and the inner casing, the compressor outlet guide vanes extending radially between and in contact with an inner wall and an outer wall, the inner wall and the outer wall diverging away from each other to form the diffuser,
the turbine nozzle guide vanes being connected to the inner casing to transmit structural loads via the compressor outlet guide vanes to the outer casing,
the cooling arrangement comprising at least a part annular manifold located axially between the compressor and the combustion chamber, the at least a part annular manifold being located radially between the outer wall and the outer casing,
the diffuser being arranged axially between the compressor and the combustion chamber,
the compressor outlet guide vanes supporting at least one aerodynamic fairing, the at least one aerodynamic fairing extending radially across the diffuser, the at least one aerodynamic fairing extending radially between the inner wall and the outer wall,
a first support structure to support the at least a part annular manifold from the inner casing, the first support structure forming a chamber with the inner casing, the first support structure comprising at least one hollow duct, each hollow duct of the at least one hollow duct being located within and behind a respective one of the at least one aerodynamic fairings, the at least one hollow duct extending radially across the diffuser from the at least a part annular manifold to the first support structure, the at least one hollow duct extending radially through the respective one of the at least one aerodynamic fairings, and
the cooling air duct, the at least a part annular manifold, the at least one hollow duct, and the first support structure being free to expand and contract independently of the inner casing.

20. A gas turbine engine comprising a compressor, a diffuser, a combustion chamber, an outer casing, an inner casing and a cooling arrangement,
the outer casing surrounding the compressor, the diffuser and the combustion chamber,
the combustion chamber having turbine nozzle guide vanes,
the compressor having structural load carrying compressor outlet guide vanes connected to the outer casing and the inner casing, the compressor outlet guide vanes extending radially between and in contact with an inner wall and an outer wall, the inner wall and the outer wall diverging away from each other to form the diffuser,
the turbine nozzle guide vanes being connected to the inner casing to transmit structural loads via the compressor outlet guide vanes to the outer casing,
the cooling arrangement comprising at least a part annular manifold located axially between the compressor and the combustion chamber, the at least a part annular manifold being located radially between the outer wall and the outer casing,
the diffuser being arranged axially between the compressor and the combustion chamber,
the compressor outlet guide vanes supporting at least one aerodynamic fairing, the at least one aerodynamic fairing extending radially across the diffuser, the at least one aerodynamic fairing extending radially between the inner wall and the outer wall, the at least one aerodynamic fairing has an open downstream end,
a first support structure to support the at least a part annular manifold from the inner casing, the first support structure being arranged around and surrounding the inner casing to form an annular chamber with the inner casing, the first support structure comprising at least one hollow duct, each hollow duct of the at least one hollow duct being located within and behind a respective one of the at least one aerodynamic fairings, the at least one hollow duct extending radially across the diffuser from the at least a part annular manifold to the first support structure, the at least one hollow duct extending radially through the respective one of the at least one aerodynamic fairings, and
the cooling air duct, the at least a part annular manifold, the at least one hollow duct, and the first support structure being free to expand and contract independently of the inner casing.

21. The gas turbine engine as claimed in claim 20,
wherein the compressor outlet guide vanes carrying a plurality of aerodynamic fairings, each aerodynamic fairing extending radially across the diffuser, each aerodynamic fairing extending radially between the inner wall and the outer wall, each aerodynamic fairing has an open downstream end,
the cooling arrangement comprising a plurality of part annular manifolds, each part annular manifold being located radially between the outer wall and the outer casing, and
the support structure comprising a plurality of hollow ducts, each hollow duct locating within and behind a respective one of the aerodynamic fairings, each hollow duct extending radially across the diffuser from an associated one of the annular manifolds to the support structure, each hollow duct extending radially through the respective one of the aerodynamic fairings.

22. The gas turbine engine as claimed in claim 20, wherein the outlet guide vanes carrying a plurality of aerodynamic fairings, each aerodynamic fairing extending radially across the diffuser, each aerodynamic fairing extending radially between the inner wall and the outer wall, each aerodynamic fairing has an open downstream end, the cooling arrangement comprising an annular manifold, the annular manifold being located radially between the outer wall and the outer casing, and the support structure comprising a plurality of hollow ducts, each hollow duct locating within and behind a respective one of the aerodynamic fairings, each hollow duct extending radially across the diffuser from the annular manifold to the support structure, each hollow duct extending radially through the respective one of the aerodynamic fairings.

* * * * *